(12) United States Patent
Yi et al.

(10) Patent No.: US 8,970,556 B2
(45) Date of Patent: Mar. 3, 2015

(54) APPARATUS TO SENSE TOUCHING AND PROXIMATE OBJECTS

(75) Inventors: Kwon Ju Yi, Yongin-si (KR); Sung Joo Suh, Seoul (KR); Chang Kyu Choi, Seongnam-si (KR); Du Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 13/447,630

(22) Filed: Apr. 16, 2012

(65) Prior Publication Data

US 2012/0268426 A1  Oct. 25, 2012

(30) Foreign Application Priority Data

Apr. 25, 2011  (KR) .................. 10-2011-0038432

(51) Int. Cl.
*G06F 3/042* (2006.01)
*G06F 3/03* (2006.01)
(52) U.S. Cl.
CPC .............. *G06F 3/042* (2013.01); *G06F 3/0304* (2013.01); *G06F 2203/04109* (2013.01)
USPC ........................................ 345/176

(58) Field of Classification Search
CPC ................ G06F 3/0428; G06F 3/0421; G06F 2203/04109; G06F 2203/04101; G06F 2203/04108
USPC ...................... 345/175–176; 178/18.09, 18.11
See application file for complete search history.

(56) References Cited

U.S. PATENT DOCUMENTS

| | | | |
|---|---|---|---|
| 2007/0152985 A1* | 7/2007 | Ostergaard et al. | 345/176 |
| 2008/0106628 A1* | 5/2008 | Cok et al. | 348/333.01 |
| 2009/0267919 A1* | 10/2009 | Chao et al. | 345/175 |
| 2010/0302196 A1* | 12/2010 | Han et al. | 345/173 |
| 2011/0037730 A1* | 2/2011 | Wang et al. | 345/175 |

FOREIGN PATENT DOCUMENTS

| | | |
|---|---|---|
| JP | 2005-197072 | 7/2005 |
| JP | 2006-351354 | 12/2006 |
| JP | 2010-086669 | 4/2010 |
| JP | 2010-230933 | 10/2010 |
| KR | 10-2005-0011901 | 1/2005 |

* cited by examiner

*Primary Examiner* — Allison Johnson
(74) *Attorney, Agent, or Firm* — NSIP Law

(57) ABSTRACT

A sensing apparatus may emit light, radiated from a light source, to an upper part and may preserve light in an internal part, based on a total internal emission angle of the light. Also, the sensing apparatus may project the light radiated to the upper part, and the light preserved in the internal part, towards at least one of a touching object and the proximate object.

15 Claims, 5 Drawing Sheets

— Emitted Light
----- Reflected Light

— Emitted Light
------ Reflected Light

→ Reflected Light

⇒ Emitted Light

······· Emitted Light
------- Reflected Light

APPARATUS TO SENSE TOUCHING AND PROXIMATE OBJECTS

CROSS-REFERENCE TO RELATED APPLICATIONS

This application claims the priority benefit of Korean Patent Application No. 10-2011-0038432, filed on Apr. 25, 2011, in the Korean Intellectual Property Office, the disclosure of which is incorporated herein by reference.

BACKGROUND

1. Field

One or more example embodiments of the present disclosure provide an apparatus for sensing a touch image generated by a touching object or a proximate image generated by a proximate object, such as a hovering object, for example, and an apparatus for displaying an information image which may respond to the sensed touch image or proximate image as an input signal.

2. Description of the Related Art

As display technology develops, interest in technology for identifying a position of an object touching a display device is increasing as well. Generally, various schemes, such as a projected capacitive touch scheme, an electrophoresis sensing scheme, or a light sensing scheme, for example, are used for sensing an object touching a surface of the display device, or an object proximate to the surface of the display device. The touching object or the proximate object may include a hand of a user, a stick, or a pen, for example.

The projective capacity scheme refers to technology for sensing an object touching a display device, such as a hand of a user. The projective capacity scheme has a limited distance in that only an object located in a position within about 5 mm from an upper part of the display device may be sensed.

The electrophoresis sensing scheme refers to technology applied to an input apparatus, such as a tablet personal computer (PC), for example. The electrophoresis sensing scheme may be used to sense a magnetophoretic object in a form of either a pen or a stick, for example. However, this scheme may be problematic when used to sense a hand of a user.

The light sensing scheme refers to technology used for sensing a hand by using a light sensor. When using the light sensing scheme, a touching object may be easily sensed. However, a proximate object may be difficult to sense.

Accordingly, there is a need for technology that can be used for sensing both a proximate object and a touching object.

SUMMARY

The foregoing and/or other aspects are achieved by providing a sensing apparatus including at least one light source to radiate light projected towards at least one of a proximate object and a touching object, and a light guide to receive the light radiated by the light source, to emit the light to an upper part, and to preserve the light in an internal part, based on a total internal reflection (TIR) angle of the light radiated by the light source.

The light guide may include a single edge having a cutting plane of a predetermined angle so that the light may be projected towards the proximate object and the touching object. In this instance, the light resource may be disposed on the cutting plane.

The light guide may include a plurality of edges, each having a cutting plane of a different angle. In this instance, the light source may be disposed on the cutting plane of each of the plurality of edges. The light source may radiate light projected towards the proximate object located in each portion of a proximate space of the upper part of the light guide.

The sensing apparatus may further include a sensor panel, disposed on a lower part of the light guide, to sense at least one of light reflected by the touching object, and light reflected by the proximate object. The sensor panel may include a lens array to concentrate the light reflected from the light guide, and a sensor array including a plurality of sensors in an array form, and disposed on a lower part of the lens array.

The lens array may project, to the sensor array, the light emitted from the light guide based on an incidence angle of the light, or may block the light to be projected to the sensor array.

The light guide may emit the light to the upper part of the light guide using the TIR angle and a TIR critical angle of the light. The light radiated to the upper part of the light guide may be projected towards a proximate space of the upper part of the light guide. The light guide may preserve the light by totally reflecting the light to an internal part of the light guide using the TIR angle and a TIR critical angle of the light. The light preserved in the internal part of the light guide may be projected towards an object touching the upper part of the light guide.

The light source may include at least one of a directional visible light source and a directional invisible light source, where the light may be intensively radiated from the center of the light source.

The foregoing and/or other aspects are achieved by providing a display apparatus including an invisible light source to radiate invisible light projected towards at least one of a proximate object and a touching object, a light guide to emit the invisible light to an upper part, and to preserve the light in an internal part, based on a total internal reflection (TIR) angle of the invisible light, and a display panel, disposed on a lower part of the light guide, to display an information image.

The light guide may include a single edge having a cutting plane of a predetermined angle so that the invisible light may be projected towards the proximate object and the touching object. The invisible light resource may be disposed on the cutting plane. Also, the light guide may include a plurality of edges, each having a cutting plane of a different angle. The invisible light source may be disposed on the cutting plane of each of the plurality of edges. The invisible light source may radiate light projected towards the proximate object located in each portion of a proximate space of the upper part of the light guide.

The display apparatus may further include a sensor panel, disposed on the lower part of the light guide, to sense at least one of invisible light reflected by the touching object, and invisible light reflected by the proximate object. The sensor panel may include a lens array, disposed on a lower part of the display panel, to concentrate the invisible light reflected from the light guide, and a sensor array disposed on a lower part of the lens array, and including a plurality of sensors in an array form.

The display panel may include a light crystal display (LCD) panel, disposed on the lower part of the light guide, to display the information image, and a backlight unit (BLU), disposed on a lower part of the LCD panel, to evenly distribute planar white light to the LCD panel. Also, the display panel may include an invisible light pass filter to pass at least one of invisible light reflected by the touching object, and invisible light reflected by the proximate object. Also, the display panel may include an organic light emitting diode (OLED) panel, including at least one OLED, which the invisible light may pass through, and a hole, disposed on the OLED panel, to pass the invisible light.

The display apparatus may further include a sensor panel, disposed on the lower part of the display panel, to sense invisible light passing through the hole.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
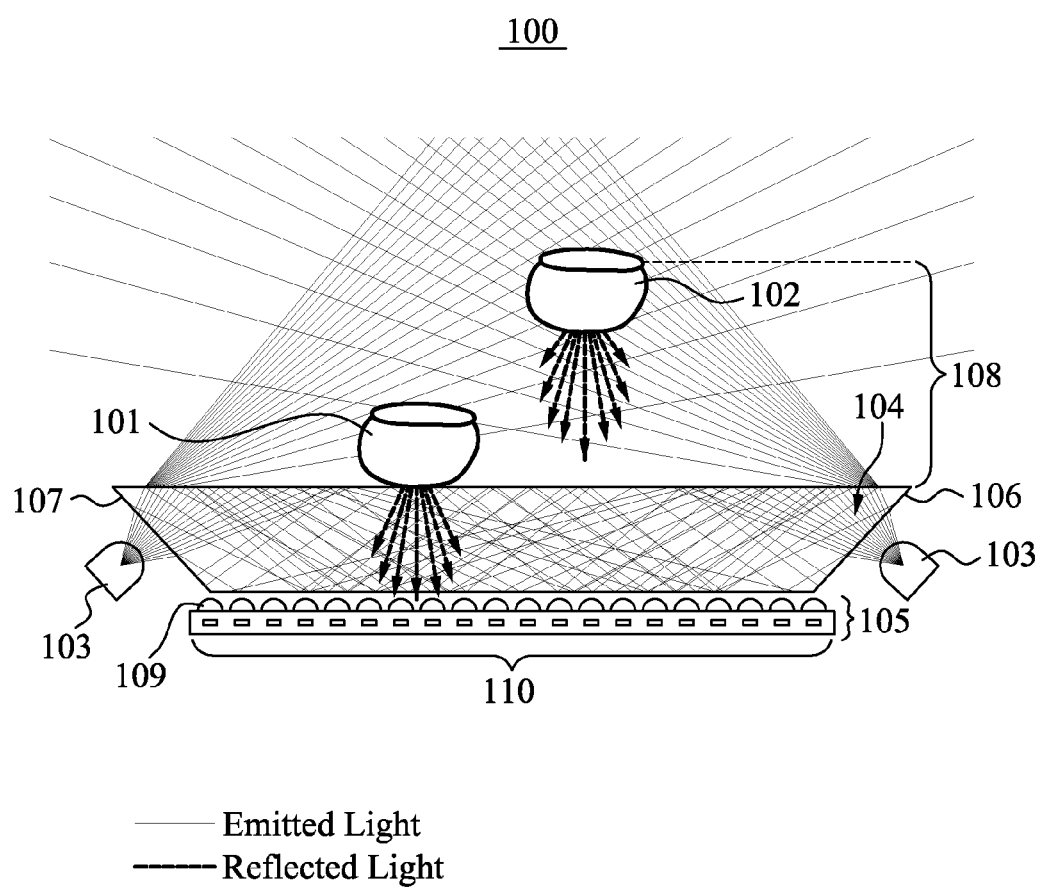
FIG. 1 illustrates an apparatus for sensing a touching object and a proximate object according to example embodiments.

Reference will now be made in detail to embodiments, examples of which are illustrated in the accompanying drawings, wherein like reference numerals refer to like elements throughout. Embodiments are described below to explain the present disclosure by referring to the figures.

FIG. 1 illustrates an apparatus 100 for sensing a touching object 101 and a proximate object 102 according to example embodiments. The proximate object may be a hovering object, for example.

Referring to FIG. 1, the sensing apparatus 100 may include a light source 103, a light guide 104, and a sensor panel 105.

The light source 103 may radiate light projected towards at least one of the proximate object 102, and the touching object 101. The light source 103 may include at least one of a directional visible light source and a directional invisible light source, where the light may be intensively radiated from the center of the light source. For example, a light emitting diode (LED), having a great directivity may be used as the light source 103.

Here, the touching object 101 may refer to an object touching an upper part of the light guide 104, and the proximate object 102 may refer to an object located in a space proximate to the upper part of the light guide 104. That is, the proximate object 102 may refer to an object located in a space proximate to the upper part of the light guide 104, instead of directly touching the upper part of the light guide 104. The object may include a hand of a user, a pen, or a stick, for example.

The light guide 104 may guide the light radiated by the light source 103 to be projected towards the touching object 101 and the proximate object 102. In particular, the light guide 104 may emit the radiated light to an upper part, and may preserve the radiated light in an internal part, based on a total internal reflection (TIR) angle and a predetermined TIR critical angle of the light radiated to the internal part of the light guide 104. Here, the light guide 104 may correspond to a front light guide. The TIR angle of the light may refer to an angle formed when the light reflected to the light guide 104 reaches an internal plane of the light guide 104. The TIR critical angle may refer to a predetermined angle based on a refractive index of the light guide 104.

For example, the light radiated by the light source 103 may totally enter the internal part of the light guide 104. The light having entered the light guide 104 may advance in the internal part of the light guide 104, and may reach the internal plane of the light guide 104. In this instance, when light, among the light reaching the internal plane of the light guide 104, has an angle, formed with a perpendicular direction of the internal plane of the light guide 104, which may be less than the critical angle, the light guide 104 may emit the corresponding light to the upper part of the light guide 104. When light, among the light having entered, has an angle, formed with the perpendicular direction of the internal plane of the light guide 104, which may be larger than the TIR critical angle, the light guide 104 may enable TIR of the corresponding light. The light having an angle larger than the critical angle may be preserved in the internal part of the light guide 104.

The light guide 104 may be made of a transparent material, such as glass, polymethyl-methacrylate (PMMA), or polycarbonate, for example. Accordingly, loss of the light having entered the light guide 104 may be reduced, or may be avoided altogether in the internal part of the light guide 104.

The light guide 104 may include a single edge having a cutting plane of a predetermined angle so that the light radiated by the light source 103 may be projected towards the proximate object 102 and the touching object 101. In this instance, the light source 103 may be disposed either on the edge having the cutting plane of the predetermined angle or adjacent to the edge, and may radiate light to the light guide 104.

Also, the light guide 104 may include a plurality of edges, for example, an edge 106 and an edge 107, each having a cutting plane of a different angle. In this instance, the light source may be disposed on the cutting plane of each of the plurality of edges, and may project the light towards the proximate object 102 located in each portion of a proximate space 108 of the upper part of the light guide 104.

For example, the light guide 104 may include four edges and the proximate space 108 is divided into four sections based on distances from the upper part of the light guide 104, sizes of each of the distances being A cm, B cm, C cm, and D cm. Here, a first light resource disposed on a first edge of the light guide 104 may radiate a first light projected towards a proximate object located in a first portion of the proximate space 108 of size A cm. A second light resource, disposed on a second edge of the light guide 104, may radiate a second light projected towards a proximate object located in a second portion of the proximate space 108 of size B cm. Similarly, a third light resource disposed on a third edge, and a fourth light resource disposed on a fourth edge may respectively radiate a third light projected towards a proximate object located in a third portion of the proximate space 108 of size C cm, and a fourth light projected towards a proximate object located in a fourth portion of the proximate space 108 of size D cm.

The sensor panel 105 may be disposed on a lower part of the light guide 104, and may sense at least one of light reflected by the touching object 101, and light reflected by the proximate object 102. In this instance, the sensor panel 105 may include a lens array 109 and a sensor array 110.

The lens array 109 may be disposed on the lower part of the light guide 104, and may concentrate the light reflected from the light guide 104 on a lens plane. The lens array 109 may control the amount of light which may enter the sensor array 110. That is, the lens array 109 may selectively project, to the sensor array 110, the light reflected from the light guide 104. As an example, the lens array 109 may project light of which TIR may be frustrated by the touching object 101 in the internal part of the light guide 104.

As another example, when the light reflected by the proximate object 102 enters the lens array 109, the lens array 109 may project the light having entered the sensor array 110 based on an incidence angle of the light reflected by the proximate object 102, or may block the light to be projected to the sensor array. For example, when the incidence angle is larger than a predetermined criterion angle, the lens array 109 may block the light having entered the lens array, not to be projected to the sensor array 110. When the incidence angle is smaller than the criterion angle, the lens array 109 may project the light having entered the lens array, to the sensor array 109. The lens array 109 may project, to the sensor array 110, the light having a small incidence angle, such as a vertical incidence. Accordingly, the sensor array 110 may sense the proximate object 102 more accurately. The sensor array 110 will be further described hereinafter.

The sensor array 110 may include a plurality of sensors in an array form, and may be disposed on a lower part of the lens array 109. Here, the sensor array 110 may sense the light projected from the lens array 109. That is, the sensor array 110 may sense the light reflected by the touching object 101, and the light reflected by the proximate object 110.

As an example, when the light radiated by the light source 103 is preserved in the internal part of the light guide 104, and the touching object 101 is located in the upper part of the light guide 104, a TIR occurring in the internal part of the light guide 104 may be frustrated by the touching object 101. The lens array 109 may project the light of which TIR may be frustrated, to the sensor array 110. The sensor array 110 may sense the light of which TIR may be frustrated, thereby sensing a location touched by the touching object 101.

As another example, when the light radiated by the light source 103 is reflected to the upper part of the light guide 104, and the proximate object 102 is located in the proximate space 108 on the upper part of the light guide 104, the sensor panel 105 may sense a target position by sensing the light reflected by the proximate object 102. The target position may refer to a position to be selected by a proximate object in a state where the upper part of the light guide is directly untouched.

The light reflected to the upper part of the light guide 104 may be projected towards the proximate space 108. When the proximate object 102 is disposed within the proximate space 108, the light reflected to the upper part may be reflected by the proximate object 102. The lens array 109 may project, to the sensor array 110, the light having a small incidence angle, such as a vertical incidence. The sensor array 110 may sense the light reflected by the proximate object 102, thereby sensing a target position within the proximate space 108. In this instance, when the proximate space 108 is divided into four sections, the sensor array 110 may sense the light reflected by the proximate object 102, thereby sensing a target position corresponding to any one of the four sections of the proximate space 108.

Figure 2:
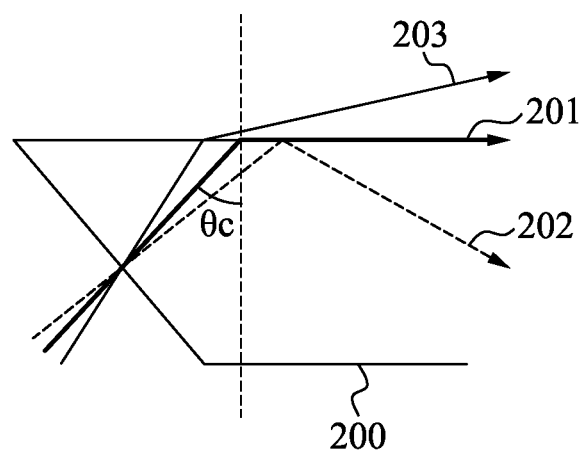
FIG. 2 illustrates an element to emit light which may be radiated by a light source of FIG. 1, to an upper part of a light guide, and to preserve the light in an internal part of the light guide according to example embodiments.

FIG. 2 illustrates a configuration to emit light which may be radiated by a light source of FIG. 1 to an upper part of a light guide 200, and to preserve the light in an internal part of the light guide according to example embodiments.

Referring to FIG. 2, the light guide 200 may emit the light radiated by the light source to an upper part of the light guide 200, based on a TIR angle and a TIR critical angle 201 of the radiated light. Here, the TIR critical angle $\theta_c$ may correspond to an exit angle between the light guide 200 and air calculated in advance according to Snell's law, and may be predetermined based on a refractive index of the light guide 200.

For example, when an angle between light 203 radiated by the light source and a perpendicular direction of an internal plane of the light guide 200 is smaller than the TIR critical angle 201, the light guide 200 may emit the light radiated by the light source to the upper part of the light guide 200. The radiated light may be projected towards the proximate space 108 of FIG. 1. In this instance, when a proximate object is located in the proximate space 108, a sensor panel may sense the light reflected by the proximate object.

Also, the light guide 200 may preserve the radiated light in an internal part of the light guide 200, based on the TIR angle and the predetermined TIR critical angle of the light. For example, when an angle between light 202 radiated by the light source and a perpendicular direction of an internal plane of the light guide 200 is larger than the TIR critical angle 201, the light guide 200 may enable TIR of the light 202 radiated by the light source to the internal part of the light guide 200. In this instance, when a touching object touches the upper part of the light guide 200, a TIR of the light may be frustrated in the internal part of the light guide 200. That is, the light on which TIR may be enabled in the internal part of the light guide 200 may be reflected by the touching object. That is, the sensor panel may sense the light reflected by the touching object.

As described with reference to FIG. 2, the light guide 200 may emit the light radiated by the light source to the upper part, and may preserve the light in the internal part, based on the TIR angle of the light. As an example, in order to adjust the TIR angle of the light, an edge of the light guide 200 may be cut based on a predetermined angle. Here, the light source may be disposed on a plane cut based on the predetermined angle. In this instance, at least one point light source having a predetermined angle may be disposed on four edges of the light guide 200, in a form of a linear light source.

Figure 3:
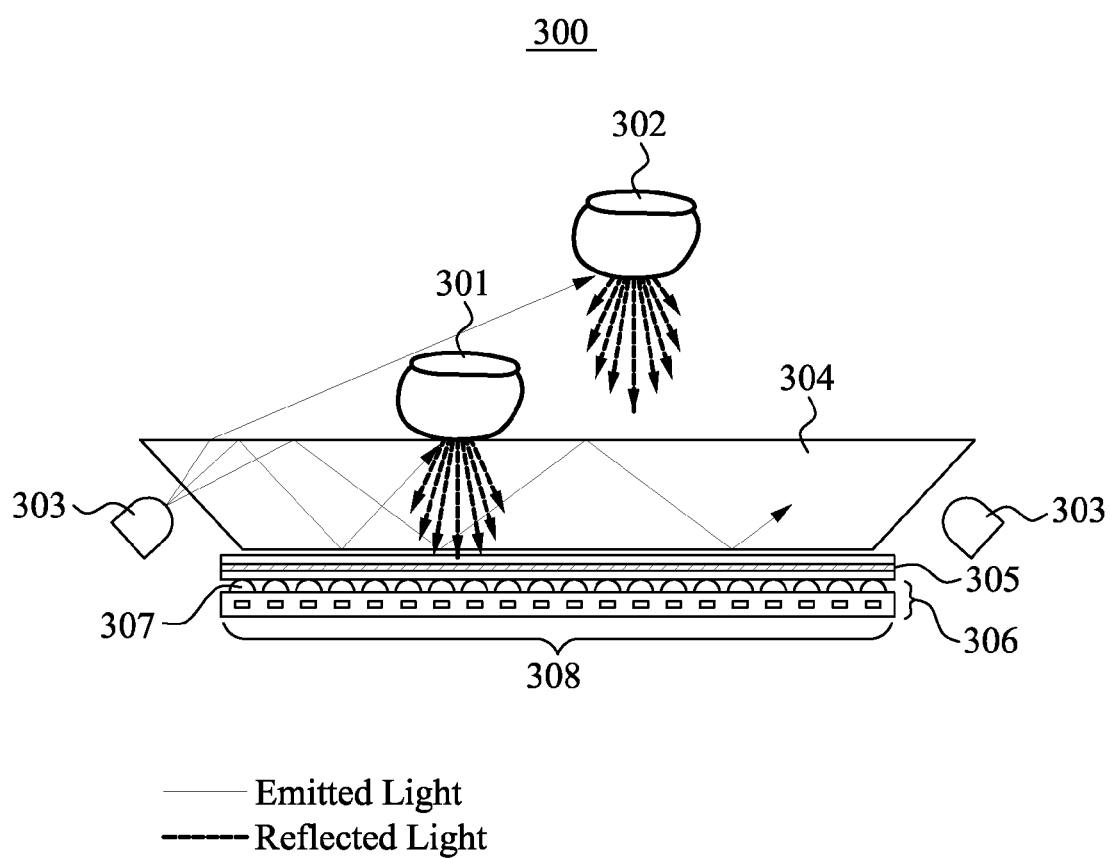
FIG. 3 illustrates a configuration of an apparatus for displaying an image generated by sensing a touching image and a proximate image according to example embodiments.

FIG. 3 illustrates a configuration of an apparatus 300 for displaying an image generated by sensing a touching image and a proximate image according to example embodiments.

The display apparatus 300 of FIG. 3 may correspond to a configuration further including a display panel 305 in the sensing apparatus of FIG. 1. Accordingly, the display apparatus 300 will be described without a duplicated description of the sensing apparatus of FIG. 1.

Referring to FIG. 3, the display apparatus 300 may include an invisible light source 303, a light guide 304, and a sensor panel 306.

The invisible light source 303 may radiate light projected towards at least one of a proximate object 302 and a touching object 301. In this instance, the invisible light source 303 may include at least one of a directional visible light source and a directional invisible light source, where the light may be intensively radiated from the center of the light source. For example, the invisible light source 303 may include an LED, or similar light sources having a great directivity.

The invisible light source 303 may be disposed on a single edge having a cutting plane of a predetermined angle, among edges constituting the light guide 304. Also, the invisible light source 303 may be disposed on each of a plurality of edges, each having a cutting plane of a different angle. The invisible light source 303 may radiate invisible light having a predetermined radiation angle, to the light guide 304.

The light guide 304 may emit, to an upper part, the invisible light radiated by the invisible light source 303, and may preserve the radiated light in an internal part, based on a TIR angle and a predetermined TIR critical angle of the radiated invisible light. Here, the light guide 304 may correspond to a front light guide. The TIR angle of the invisible light may refer to an angle formed when the invisible light is radiated to the light guide 104 reaches an internal plane of the light guide 304. The TIR critical angle may refer to an angle predetermined based a refractive index of the light guide 304.

As an example, when an angle between the invisible light and a perpendicular direction of an internal plane of the light guide 304 is smaller than the TIR critical angle, the light guide 304 may emit the invisible light radiated by the invisible light source 303, to the upper part of the light guide 304. The invisible light emitted to the upper part may be projected towards a proximate space on the upper part of the light guide 304. When the invisible light is projected towards the proximate space, the invisible light may be reflected by the proximate object 302 to the light guide 304.

As another example, when an angle between the invisible light and a perpendicular direction of an internal plane of the light guide 304 is larger than the TIR critical angle, the light guide 304 may preserve the invisible light radiated by the invisible light source 303 by enabling TIR of the invisible light to the internal part. Here, the invisible light for which TIR may be enabled to the internal part of the light guide 304, TIR of the invisible light may be frustrated by the touching object 301 disposed on a surface of the upper part of the light guide 304. As a result of the frustrated TIR, the invisible light reflected by the touching object 301 may be reflected to the light guide 304.

By way of example, the light guide 304 may include a plurality of edges, each having a cutting plane of a different angle. Here, the invisible light source may be disposed on each of the plurality of edges. That is, the invisible light source, in a form of a point light source, may be disposed on each of the plurality of edges of the light guide 304 in a form of a linear light source.

For example, when the light guide 304 includes four edges and the proximate space is divided into four sections based on distances from the upper part of the light guide 304, a first edge may be cut by a first angle corresponding to a first portion of the divided proximate space, a second edge may be cut by a second angle corresponding to a second portion of the divided proximate space, a third edge may be cut by a third angle corresponding to a third portion of the divided proximate space, and a fourth edge may be cut by a fourth angle corresponding to a fourth portion of the divided proximate space. The invisible light source disposed on each edge may radiate invisible light having a predetermined radiation angle. The invisible light radiated by each edge, and reflected to the upper part of the light guide 304 may be projected towards a particular portion among the four sections of the divided proximate space. The invisible light may be respectively projected towards the proximate object 302 disposed in a particular portion among the plurality of sections.

The display panel 305 may be disposed on a lower part of the light guide 304, and may display an information image generated by the touching object 301 or the proximate object 302. The information image may correspond to an image for showing information corresponding to information equipment of the user, or an image generated when the touching object 301 or the proximate object 302 selects a particular location. For example, when a zoom-in item is selected by the touching object 301 or the proximate object 302, the information image may correspond to an extended image.

As an example, the display panel 305 may include a light crystal display (LCD) panel, and a backlight unit (BLU). The LCD panel may be disposed on the lower part of the light guide 304, and may display the information image. The BLU may be disposed on a lower part of the LCD panel, and may evenly distribute planar white light to the LCD panel.

In this instance, the display panel 305 may further include an invisible light pass filter. Here, the invisible light pass filter may pass, through the sensor panel 306, the invisible light reflected by the touching object 301, and the invisible light reflected by the proximate object 302.

The sensor panel 306 may be disposed on a lower part of the display panel 305, and may sense at least one of the invisible light reflected by the touching object 301, and the invisible light reflected by the proximate object 302. Here, the sensor panel 306 may include a lens array 307, and a sensor array 308.

The lens array 307 may be disposed on the lower part of the display panel 305, and may concentrate the invisible light reflected from the light guide 304, through the display panel 305 on a lens array 307. The lens array 307 may project the invisible light to the sensor array 308, or may block the invisible light to be projected, based on an incidence angle of the invisible light. Here, the lens array 307 may include a plurality of lenses disposed in an array form. The lens array 307 may project, to the sensor array 308, the invisible light reflected by the touching object 301.

When the incidence angle of the invisible light reflected by the proximate object 302 is smaller than a predetermined criterion angle, the lens array 307 may project, to the sensor array 308, the invisible light reflected by the proximate object 302. For example, the lens array 307 may project, to the sensor array 308, light only vertically incident to a lens, among invisible light reflected by the proximate object 302.

When the incidence angle of the invisible light reflected by the proximate object 302 is larger than the predetermined criterion angle, the lens array 307 may block the invisible light reflected by the proximate object 302, not to be projected to the sensor array 308.

The sensor array 308 may be disposed under a lower part of the lens array 307, and may include a plurality of sensors in an array form. The sensor array 308 may sense the invisible light reflected by the touching object 301, and the invisible light reflected by the proximate object 302. The display panel 305 may display the information image generated when the sensor array 308 senses the invisible light.

Figure 4:
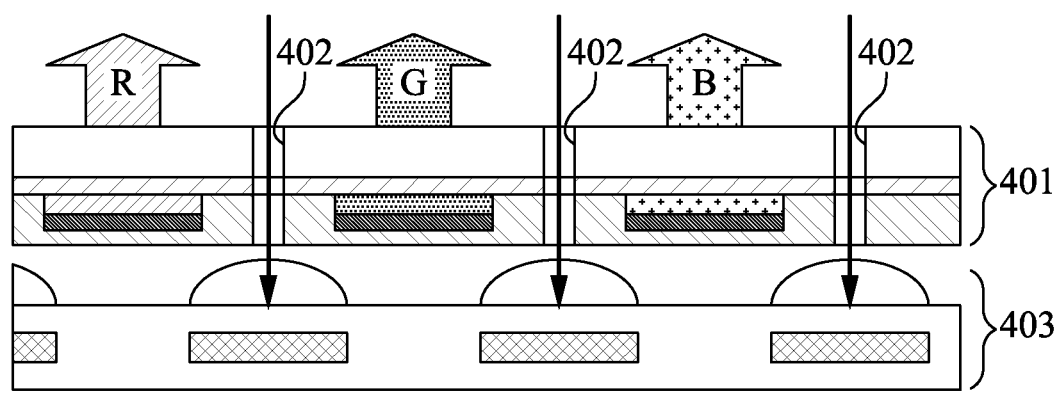
FIG. 4 illustrates a display panel and a sensor panel using an organic light emitting diode (OLED) according to example embodiments.

FIG. 4 illustrates a display panel 401 and a sensor panel 403 using an organic light emitting diode (OLED) according to example embodiments.

The display panel 401 of FIG. 4 may correspond to a display panel used when an OLED panel is used as the display panel 305 of FIG. 3, instead of an LCD panel. The OLED panel may be disposed on a lower part of the light guide 304 of the FIG. 3, and may display an information image. The OLED panel may include at least one OLED that may emit visible light to display the information image.

As an example, the OLED panel may include at least one OLED, in a panel form, that may emit the same color of visible light. As another example, the OLED panel may include at least one OLED that may emit various colors of visible light, such as red (R), green (G), or blue (B), for example.

In this instance, a light guide may be disposed on an upper part of the OLED panel, and an invisible light source having a predetermined radiation angle may be disposed on each edge constituting the light guide. A hole 402 may be disposed inside the OLED panel, and may pass the invisible light and shadow reflected by a touching object and a proximate object, to the sensor panel 403.

The sensor panel 403 may be disposed on a lower part of the display panel 401, and may sense the invisible light passing through the hole 402. For example, the sensor panel 403 may sense invisible light passing through the hole 402, among the invisible light reflected by the touching object. Similarly, the sensor panel 403 may sense invisible light passing through the hole 402, among the invisible light reflected by the proximate object.

Figure 5:
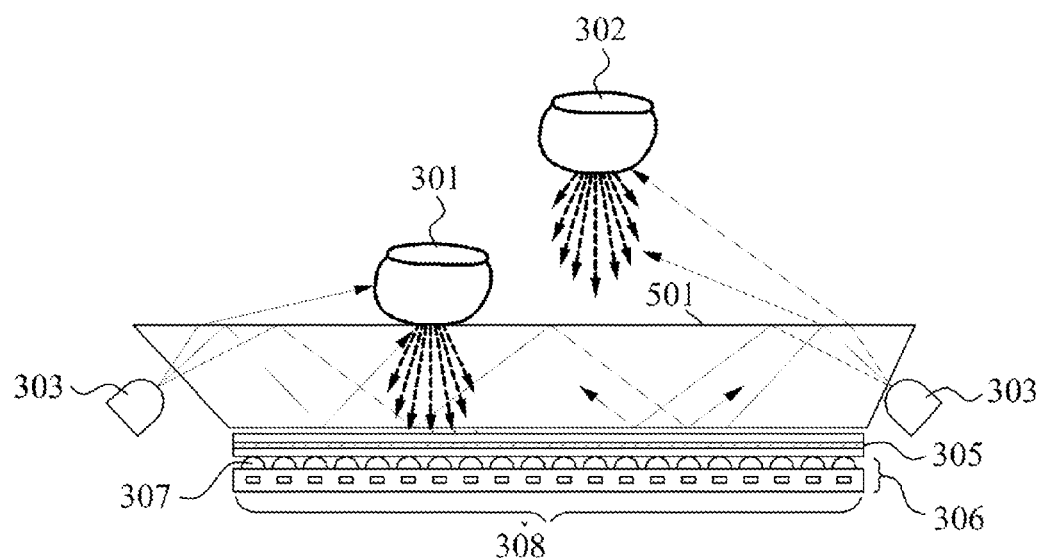
FIG. 5 illustrates a configuration of an apparatus for displaying an image generated by sensing a touching image and a proximate image according to another example embodiment.

As aforementioned, according to example embodiments of the present disclosure, both a proximate object and a touching object may be sensed by disposing a light source on an edge of a light guide, which may be cut by a predetermined angle. Also, light reflected to an upper part of the light guide and light for which TIR may be enabled to an internal part of the light guide may be controlled based on a TIR angle of the light reflected to the light guide. Further, a proximate object located in each portion of a proximate space, which may be divided into a plurality of sections, may be sensed using each light source disposed on edges, each being cut by a different angle. For example, referring to FIG. 5, the display apparatus 500 may include an invisible light source 303, a light guide 501, and a sensor panel 306. The light guide 501 may include a plurality of edges, each having a cutting plane of a different angle, the angle being between the surface of the upper part of the light guide 501 and the surface of the cutting plane. Each light source may radiate light projected to a proximate object located in a different section of a proximate space of the upper part of the light guide 501 according to each different cutting plane angle.

Although embodiments have been shown and described, it would be appreciated by those skilled in the art that changes may be made to these embodiments without departing from the principles and spirit of the disclosure, the scope of which is defined by the claims and their equivalents.

What is claimed is:

1. A sensing apparatus, comprising:
a plurality of light sources each radiating light projected towards at least one of a proximate object and a touching object; and
a light guide to receive the light radiated by each light source, to emit a portion of the light radiated by each light source to an upper part of the light guide, and to preserve another portion of the light radiated by each light source in an internal part of the light guide, based on a total internal reflection (TIR) angle of the light emitted by each light source,
wherein the light guide comprises a plurality of edges, each having a cutting plane of a different angle, the angle being between the surface of the upper part of the light guide and the surface of the cutting plane,
wherein each light source is disposed on a respective cutting plane of one of the plurality of edges,
wherein each light source radiates light projected to a proximate object located in a different section of a proximate space of the upper part of the light guide according to each different cutting plane angle.

2. The apparatus of claim 1, further comprising a sensor panel, disposed on a lower part of the light guide, to sense at least one of light reflected by the touching object, and light reflected by the proximate object.

3. The apparatus of claim 2, wherein the sensor panel comprises:
a lens array to concentrate the light reflected from the light guide; and
a sensor array including a plurality of sensors in an array form, and disposed on a lower part of the lens array.

4. The apparatus of claim 3, wherein the lens array projects, to the sensor array, the light reflected from the light guide based on an incidence angle of the light, or to block the light to be projected to the sensor array.

5. The apparatus of claim 1, wherein
the light guide emits the light to the upper part of the light guide using the TIR angle and a TIR critical angle of the light, and
the light emitted to the upper part of the light guide is projected towards the proximate space of the upper part of the light guide.

6. The apparatus of claim 1, wherein
the light guide preserves the light by performing TIR on the light to an internal part of the light guide using the TIR angle and a TIR critical angle of the light, and
the light preserved in the internal part of the light guide is projected towards an object touching the upper part of the light guide.

7. The apparatus of claim 1, wherein the light source comprises at least one of a directional visible light source and a directional invisible light source, where the light is intensively radiated from the center of the light source.

8. A display apparatus, comprising:
a plurality of invisible light sources each radiating invisible light projected towards at least one of a proximate object and a touching object;
a light guide to emit a portion of each invisible light radiated by each invisible light source to an upper part, and to preserve another portion of the invisible light radiated by each invisible light source in an internal part, based on a total internal reflection (TIR) angle of the invisible light emitted by each invisible light source; and
a display panel, disposed on a lower part of the light guide, to display an information image,
wherein the light guide comprises a plurality of edges, each having a cutting plane of a different angle, the angle being between the surface of the upper part of the light guide and the surface of the cutting plane,
wherein each invisible light source is disposed on a respective cutting plane of one of the plurality of edges,
wherein each invisible light source radiates invisible light projected to a proximate object located in a different section of a proximate space of the upper part of the light guide according to each different cutting plane angle.

9. The apparatus of claim 8, further comprising a sensor panel, disposed on the lower part of the light guide, to sense at least one of invisible light reflected by the touching object, and invisible light reflected by the proximate object.

10. The apparatus of claim 9, wherein the sensor panel comprises:
a lens array, disposed on a lower part of the display panel, to concentrate the invisible light reflected from the light guide; and
a sensor array disposed on a lower part of the lens array, and including a plurality of sensors in an array form.

11. The apparatus of claim 8, wherein the display panel comprises:
a light crystal display (LCD) panel, disposed on the lower part of the light guide, to display the information image; and
a backlight unit (BLU), disposed on a lower part of the LCD panel, to evenly distribute planar white light to the LCD panel.

12. The apparatus of claim 8, wherein the display panel comprises an invisible light pass filter to pass at least one of invisible light reflected by the touching object, and invisible light reflected by the proximate object.

13. The apparatus of claim 8, wherein the display panel comprises:
   an organic light emitting diode (OLED) panel, including at least one OLED, which the invisible light passes through; and
   a hole, disposed on the OLED panel, to pass the invisible light.

14. The apparatus of claim 13, further comprising a sensor panel, disposed on the lower part of the display panel, to sense invisible light passing through the hole.

15. A method of identifying a position of an object proximate to a display device, comprising:
   emitting light from each of light sources projected towards at least one of a proximate object and a touching object; and
   receiving, using a light guide, the light emitted by each light source, reflecting a portion of the emitted light to an upper part of the light guide, and preserving another portion of the emitted light in an internal part of the light guide, based on a total internal reflection (TIR) angle of the light radiated by each light source,
   wherein the light guide comprises a plurality of edges, each having a cutting plane of a different angle, the angle being between the surface of the upper part of the light guide and the surface of the cutting plane,
   wherein each light source is disposed on a respective cutting plane of one of the plurality of edges,
   wherein each light source emits light projected to a proximate object located in a different section of a proximate space of the upper part of the light guide according to each different cutting plane angle.

* * * * *